United States Patent
Yano et al.

(10) Patent No.: US 8,483,063 B2
(45) Date of Patent: Jul. 9, 2013

(54) MOBILE COMMUNICATION SYSTEM AND COMMUNICATION METHOD

(75) Inventors: Masashi Yano, Kawasaki (JP);
Masahiro Takatori, Yokohama (JP);
Naruhito Nakahara, Yokohama (JP);
Nodoka Mimura, Kunitachi (JP)

(73) Assignee: Hitachi, Ltd., Tokyo (JP)

( * ) Notice: Subject to any disclaimer, the term of this patent is extended or adjusted under 35 U.S.C. 154(b) by 280 days.

(21) Appl. No.: 12/987,665

(22) Filed: Jan. 10, 2011

(65) Prior Publication Data

US 2011/0228697 A1  Sep. 22, 2011

(30) Foreign Application Priority Data

Mar. 19, 2010  (JP) .................................. 2010-064443

(51) Int. Cl.
*H04J 3/16* (2006.01)

(52) U.S. Cl.
USPC ........................................... 370/235; 370/468

(58) Field of Classification Search
USPC ................. 370/229–232, 235, 252, 392, 400, 370/401, 464, 465, 468
See application file for complete search history.

(56) References Cited

U.S. PATENT DOCUMENTS

| 6,215,769 | B1 | 4/2001 | Ghani et al. |
| 2001/0032269 | A1* | 10/2001 | Wilson ........................... 709/235 |
| 2002/0150048 | A1* | 10/2002 | Ha et al. .......................... 370/231 |
| 2009/0067396 | A1* | 3/2009 | Fischer .......................... 370/338 |
| 2009/0319851 | A1* | 12/2009 | Li .................................... 714/749 |
| 2010/0103819 | A1* | 4/2010 | Samuels et al. ............... 370/235 |
| 2010/0226250 | A1* | 9/2010 | Plamondon .................... 370/230 |
| 2010/0226349 | A1* | 9/2010 | Matsuo et al. ................. 370/338 |
| 2011/0066752 | A1* | 3/2011 | Lippincott et al. ............ 709/233 |

FOREIGN PATENT DOCUMENTS

| JP | 11-225166 A | 8/1999 |
| JP | 2002-527936 A | 8/2002 |
| JP | 2009-188739 A | 8/2009 |

OTHER PUBLICATIONS

Kasutaka Yamamoto et al., "Improving TCP Performance Over Cellular Telephone Network by Cooperative Gateway", Information Processing Society of Japan, Jan. 21, 1999, pp. 91-96, including an English language abstract.
Japanese Office Action dated Feb. 12, 2013 w/ English translation (eight (8) pages).

\* cited by examiner

*Primary Examiner* — Kerri Rose
(74) *Attorney, Agent, or Firm* — Crowell & Moring LLP

(57) ABSTRACT

Disclosed is a mobile communication system preventing the transmission of acknowledgements at a burst leading to a decrease in throughput caused by detecting the retransmission and the congestion of packets at the protocol of a transport layer. In a mobile communication system including a mobile terminal and gateway equipment for relaying a packet between a communication partner and the mobile terminal, if the gateway equipment receives the acknowledgement from the mobile terminal, the gateway equipment waits the transmission of the received acknowledgement to the communication partner until the estimated transmission time passes from the time at which the gateway equipment receives the previous acknowledgement from the mobile terminal.

16 Claims, 10 Drawing Sheets

MOBILE COMMUNICATION SYSTEM AND COMMUNICATION METHOD

CLAIM OF PRIORITY

The present application claims priority from Japanese patent application JP 2010-064443 filed on Mar. 19, 2010, the content of which is hereby incorporated by reference into this application.

FIELD OF THE INVENTION

The present invention relates to a mobile communication system for communicating a packet between gateway equipment and a mobile terminal and, in particular, to a mobile communication system in which the gateway equipment causes the mobile terminal to wait the transmission of an acknowledgement for a packet.

BACKGROUND OF THE INVENTION

At present, a mobile communication system called the third and a half generation has prevailed. An environment has further been improved in which a mobile terminal is connected to the Internet to use an electronic mail and the Web access.

On the other hand, the next generation radio communication service with a broader bandwidth (5 MHz or higher) and a high transmission rate of 10 Mbps or higher has been standardized and developed. The next generation radio communication service is known as the 3.9 generation mobile communication system called worldwide interoperability for microwave access (WiMAX) and long term evolution (LTE) using orthogonal frequency division multiplexing access (OFDMA).

In general, a transmission control protocol (TOP) used as a transport protocol between a mobile terminal and a server system has a retransmission control function using a sequence number (control number) and an acknowledgement. Thereby, the TOP can provide a high reliability communication. The TOP has a rate control function to transmit the next packet in conformity with a timing in which the acknowledgement arrives in order to transmit a packet in conformity with the bandwidth of a network.

In general, the transmission rate of a radio access is network between a mobile terminal and a base station is lower than that of a network between a server system and a wireless access gateway. For this reason, if congestion in which a buffering packet increases is detected in the entity of a link layer in the radio access network, gateway equipment (a node) (or a base station or a wireless access gateway) adjusts the pacing of transmission of an acknowledgement by buffering a packet of the acknowledgement (refer to JP-T-2002-527936, for example).

SUMMARY OF THE INVENTION

The 3.9 generation mobile communication system such as the WiMAX and the LTE has presently been studied. It is expected that a radio communication system with a transmission rare of 10 Mbps or higher per user is available.

Fading and shadowing caused by the movement of a mobile terminal between the mobile terminal and a base station can cause an error in a radio link layer between the mobile terminal and the base station. An automatic repeat request (ARQ) for automatically retransmitting a link layer between the mobile terminal and the base station, a radio base station control apparatus, or a wireless access gateway is used as a unit for recovering the error of the radio link layer.

On the other hand, for the speed of an interface of a server system used for a data center, the speed of a gigabit interface has been generalized. In recent years, an interface with a transmission rate of as high as 10 Gbps has been introduced to a server system. For this reason, even though the next generation mobile communication system is introduced, the speed of the interface of a mobile terminal tends to deviate from that of the interface of the server system.

In general, a transport protocol such as the TCP used between a mobile terminal and a server includes a congestion control function to control the transmission rate of a packet to prevent the packet from being dropped due to a failure of storing queues (queue overflow) for transmitting a packet at a router or a switch and a base station in a network attributed to the reception capacity of a mobile terminal and the transmission bandwidth in a network. The TOP includes a function called a self clocking for a server transmitting a packet in conformity with a timing in which an acknowledgement arrives at the server as a function to control the transmission rate of the packet in conformity with the bandwidth of a network.

A radio resource divided by a frequency and a time base between the mobile terminal and the base station is allocated to each mobile terminal. For a packet whose length is shorter than that of a predetermined packet, a packet transmitted from the base station to the server may be transmitted at a burst by transmitting a plurality of packets buffered at the base station until the transmission timing of the allocated resource in one transmission timing.

If the ARQ is introduced between the mobile terminal and the base station, an error is caused in the block of a part of the ARQ. If a subsequent block is normally received and buffered and the error in the block is recovered by retransmission, the block buffered on the reception side and the block in which the error is recovered can be transmitted at a burst.

A case where a block is transmitted at a burst in the ARQ is described below with reference to FIG. 10.

FIG. 10 is a conventional diagram of the present invention.

A self clocking for transmitting the next packet when an acknowledgement is received is implemented in a transport protocol between a server 101 and a mobile terminal 104.

When the server 101 receives the acknowledgement from the mobile terminal 104, the mobile terminal 104 transmits a data packet to be transmitted next to the data packet corresponding to the received acknowledgement to the mobile terminal 104.

In FIG. 10, the server 10 initially transmits a data packet for a transmittable window size without waiting an acknowledgement.

When the base station 103 receives the data packet for a transmittable window size, the base station 103 divides the received data packet into four blocks of a sequence number (SN) (0 to 3) and relays the blocks to the mobile terminal 104.

When the mobile terminal 104 receives the blocks from the base station 103, the mobile terminal 104 transmits the acknowledgement provided with the same number as the received blocks to the base station 103.

In FIG. 10, the base station 103 detects an error in an ARQ block of an acknowledgement with a sequence number of 0 and cancels the ARQ block of an acknowledgement (1001). The base station 103 normally receives the ARQ block of an acknowledgement of sequence numbers (1 to 3) (1002 to 1004).

The base station 103 requests the ARQ block of an acknowledgement of a control number 0 for retransmission.

The ARQ blocks of all acknowledgements corresponding to the data packet for a window size are not completed, so that the ARQ blocks of acknowledgements of control numbers 1 to 3 received in steps 1002 to 1004 are buffered.

When the base station 103 normally receives the ARQ block of an acknowledgement of a control number 0 (1005), the ARQ blocks of all acknowledgements corresponding to the data packet for one window size are completed, so that the base station 103 transmits these four acknowledgements at a burst (1006).

When the server 101 receives the acknowledgements transmitted from the base station 103, the server 101 transmits the next packet. Since the acknowledgements have been transmitted at a burst from the base station 103, the server 101 transmits packets at a burst (1007).

Since the transmission rate of a radio access network is lower than that of the server network between the server 101 and a wireless access gateway 102, if there is insufficient space in queue of a router and a switch composing the radio access network between the wireless access gateway 102 and the base station 103, the router and the switch cannot completely buffer the queue to cause the overflow of the queue, thereby the transmission of packets at a burst breaks packets to be transmitted (1008).

Since the transmission rate of the radio network between the base station 103 and the mobile terminal 104 is lower than that of the server network, if there is insufficient space in queue at the base station 103, the overflow of the queue is caused to break the packet to be transmitted (1009).

Thus, throughput is lowered by losing packets at the router and the switch which configure the radio access network and the base station 103.

Even if packets are not lost at the router, the switch, and the base station 103 configuring the radio access network, packets are incorrectly retransmitted at the protocol of a transport layer.

The present invention has an object to provide a mobile communication system preventing the transmission of acknowledgements at a burst leading to a decrease in throughput caused by detecting the retransmission and the congestion of packets at the protocol of such a transport layer.

According to one aspect of the present invention, a mobile communication system includes a mobile terminal and gateway equipment for relaying a packet between a communication partner and the mobile terminal, wherein the gateway equipment stores information about a transmission rate between the mobile terminal, and the gateway equipment; stores a packet length of a packet relayed from the communication partner to the mobile terminal and the time at which an acknowledgement corresponding to the packet transmitted from the mobile terminal to the communication partner is received in a process related to a transport protocol used between the mobile terminal and the communication partner in a case where the packet is relayed from the mobile terminal to the gateway equipment; estimates a transmission time required for transmitting the packet from the gateway equipment to the mobile terminal based on the length of a packet and the transmission rate to the mobile terminal; and takes a relay time interval at which the acknowledgement from the mobile terminal is relayed to communication partner as the estimated transmission time interval by waiting, if the gateway equipment receives the acknowledgement from the mobile terminal, the transmission of the received acknowledgement to the communication partner until the estimated transmission time passes from the time at which the gateway equipment receives the previous acknowledgement from the mobile terminal.

According to the present invention, the transmission of acknowledgements at a burst can be prevented, so that the lowering of throughput caused by detecting the retransmission and the congestion of packets at the protocol of the transport layer can be prevented.

DETAILED DESCRIPTION OF THE PREFERRED EMBODIMENTS

First to third embodiments of the present invention are described below with reference to FIGS. 1 to 9.

First Embodiment

The first embodiment of the present invention is described below with reference to FIGS. 1 to 6.

Figure 1:
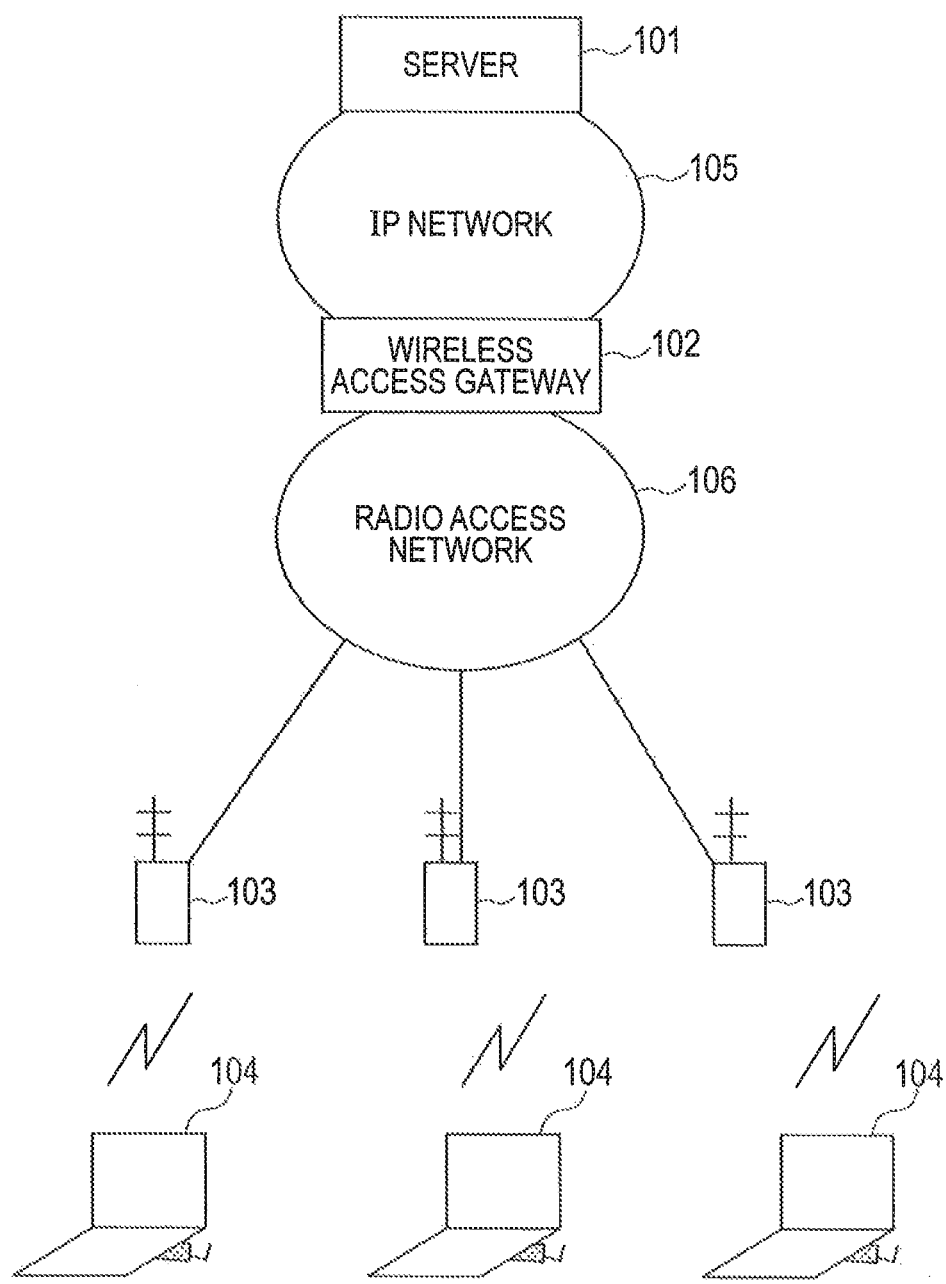
FIG. 1 is a schematic diagram showing a configuration of a mobile communication system according to a first embodiment of the present invention.

FIG. 1 is a schematic diagram showing a configuration of a mobile communication system according to the first embodiment of the present invention.

The mobile communication system includes a server 101, a wireless access gateway 102, a base station 103, and a mobile terminal 104. The wireless access gateway 102 and the base station 103 are generically referred to as gateway equipment.

The server 101 communicates with the wireless access gateway 102 via an IP network 105. Communication is made via a radio access network 106 between the wireless access gateway 102 and the base station 103 and between the base station 103 and the mobile terminal 104.

The transmission rate (a guaranteed bit rate for each bearer used by the mobile terminal 104 or a maximum bit rate of an individual or collective bearers) of the radio access network 106 is lower than that of the IP network 105.

The server 101 is a communication partner of the mobile terminal 104 and transmits a packet to the mobile terminal 104. When the server 101 transmits data to the mobile terminal 104, the server 101 first transmits a packet for a window size transmittable without waiting an acknowledgement and then transmits the next packet to the mobile terminal 104 each time an acknowledgement is received.

The wireless access gateway 102 is installed between the IP network 105 and the radio access network 106 and relays a packet between the server 101 and the base station 103.

The wireless access gateway 102 is described in detail below.

The wireless access gateway 102 manages the moving status of the mobile terminal 104 in the radio access network 106. The wireless access gateway 102 executes paging for the mobile terminal 104 in the radio access network 106. Furthermore, the wireless access gateway 102 executes processing for incoming/outgoing call setup control of the mobile terminal 104 and for switching the base station 103 (handoff) in a case where the mobile terminal 104 is in communication.

Other than that, the wireless access gateway 102 has a function to relay a packet between the mobile terminal 104 and the server 101 while following the base station 103 subordinating the mobile terminal 104. The wireless access gateway 102 executes processing for the mobile terminal 104 receiving the service of the IP network 105 (the terminal authentication of the mobile terminal 104, service authentication, and the allocation of IP address).

If the LTE of the 3.9 generation mobile communication system is introduced, the wireless access gateway 102 corresponds to mobility management entity (MME), service gateway (S-GW), and packet data network gateway (P-GW).

If the WiMAX of the 3.9 generation mobile communication system is introduced, the wireless access gateway 102 corresponds to access service gateway (ASN-GW).

The base station 103 communicates with the mobile terminal 104 by radio and relays communication between the mobile terminal 104 and the server 101.

The mobile terminal 104 corresponds to a cellular phone or a portable personal computer, for example.

Figure 2:
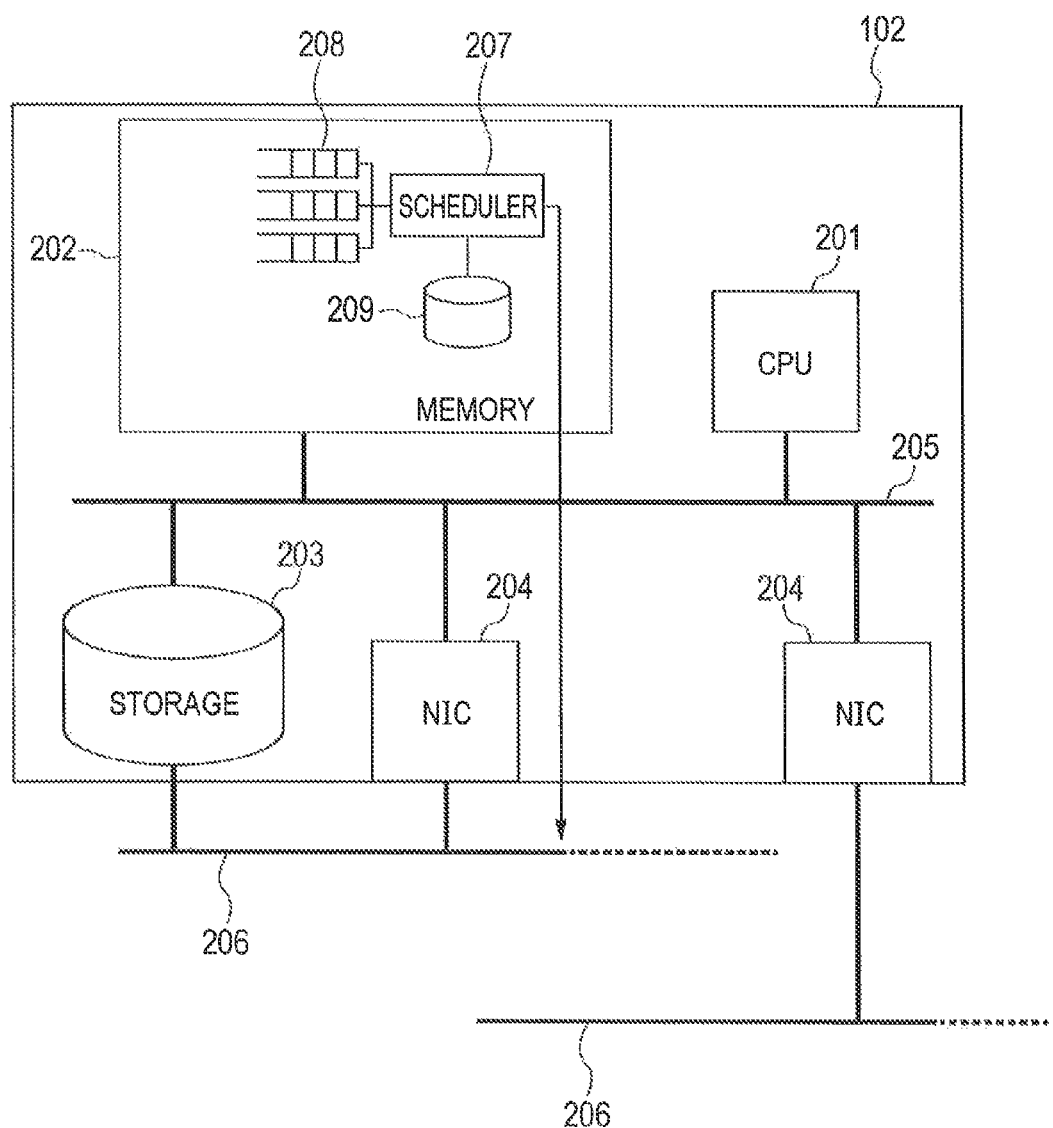
FIG. 2 is a schematic diagram showing a configuration of a wireless access gateway according to the first embodiment of the present invention.

FIG. 2 is a schematic diagram showing a configuration of the wireless access gateway 102 according to the first embodiment of the present invention.

The wireless access gateway 102 includes a CPU 201, a memory 202, a storage 203, and a network interface card (NIC) 204. The CPU 201, the memory 202, the storage 203, and the network interface card (NIC) 204 are connected with one another via a bus 205.

The CPU 201 executes calculation processing such as the execution of a program stored in the memory 202.

The memory 202 stores program groups for operating the wireless access gateway 102. Specifically, the memory 202 stores program groups for executing the mobility management of the mobile terminal 104, the paging for the mobile terminal 104, the incoming/outgoing call setup control of the mobile terminal 104, and the call processing for the mobile terminal 104 switching the base station 103 in communication. Furthermore, the memory 202 stores various table groups used by the CPU 201 when the program groups are executed.

The memory 202 further includes a queue 208 for receiving and buffering a packet addressed to the mobile terminal 104 or the server 101, a scheduler 207 for extracting the packet from the queue 208 and transmitting the packet to a network via the NIC 204, and a scheduler table 209 to which the scheduler 207 refers in extracting the packet from the queue 208.

The storage 203 is a storage for the memory 202.

The NIC 204 is an interface for connecting the wireless access gateway 102 to an external network 206 communicable with the server 101 and the base station 103.

Figure 3:
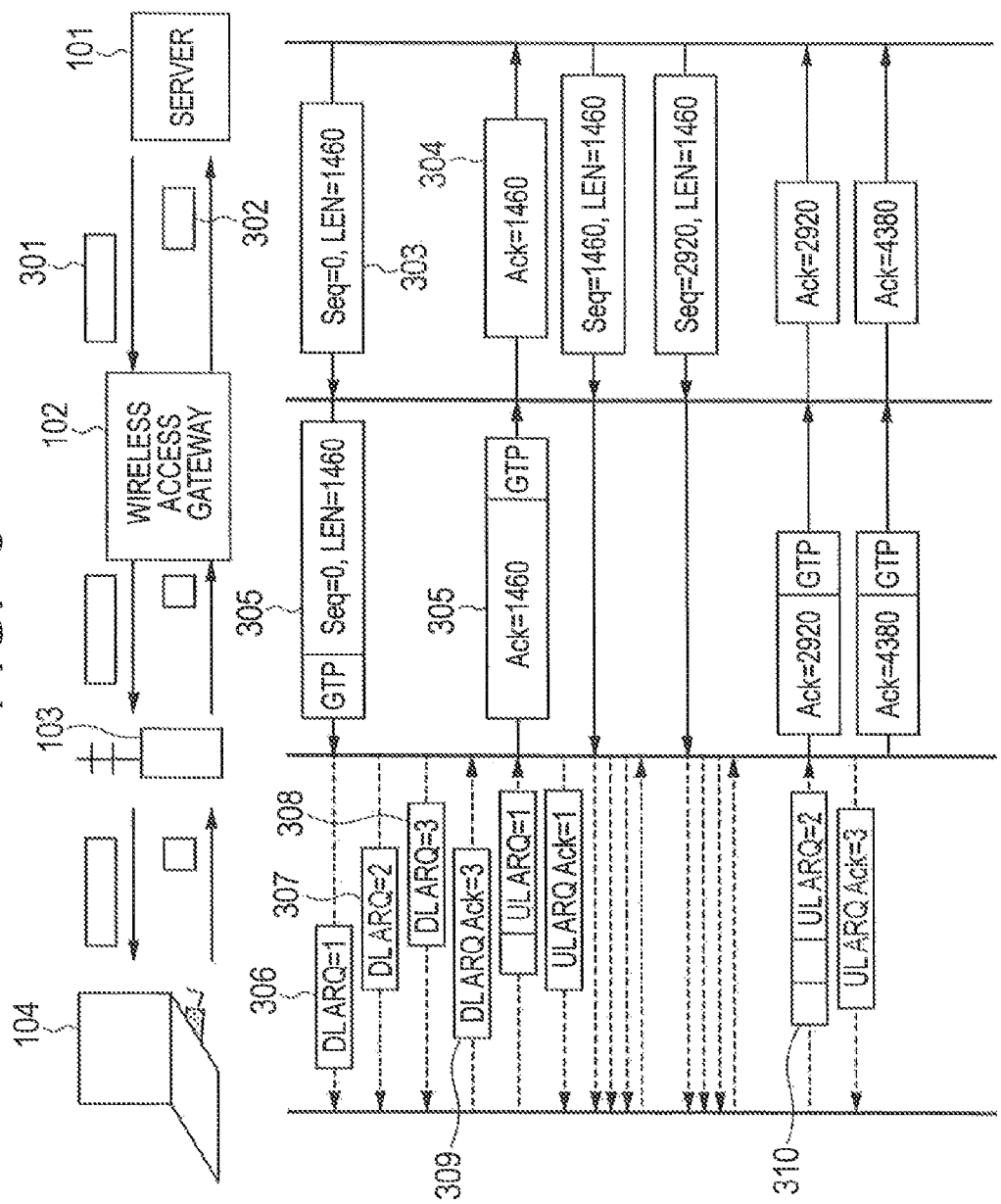
FIG. 3 is an operational diagram in a case where a TOP is used as a transport protocol between the mobile terminal and the server in the first embodiment of the present invention.

FIG. 3 is an operational diagram in a case where the TCP is used as a transport protocol between the mobile terminal 104 and the server 101 in the first embodiment of the present invention.

The server 101 transmits a data packet to the mobile terminal 104 (301). The mobile terminal 104 receives the data packet and transmits an acknowledgement to the server 101 (302).

The TCP header of the data packet transmitted from the server 101 stores a sequence number (Seq) and a packet length data (LEN) indicating the packet length of the data packet (303). The sequence number is incremented by one each time 1-byte packet is transmitted.

The TCP header of the acknowledgement transmitted from the mobile terminal 104 stores the sequence number included in the data packet received by the mobile terminal 104 as a confirmation number (304).

The wireless access gateway 102 capsules the data packet transmitted from the server 101 in the IP packet to transmit the encapsulated data packet to the base station 103 housing the mobile terminal 104 to which the data packet is addressed (305). The IP packet for encapsulating the data packet is referred to as a generic routing encapsulation (GRE) or a GPRS tunneling protocol (GTP). Similarly, the base station 103 encapsulates the acknowledgement transmitted from the mobile terminal 104 by the IP packet (305). In other words, communication is made by the encapsulated data packet between the wireless access gateway 102 and the base station 103.

The repeat request of a radio link layer called the ARQ or a Hybrid ARQ is used between the mobile terminal 104 and the base station 103. In this case, if the capacity of the packet transmitted and received by the mobile terminal 104 is larger than that of a block used by the ARQ, the packet is divided into a block capacity (block size) and transmitted (306 to 308). The packet divided into the block capacity is reconstructed on the reception side. If the capacity of the packet transmitted and received by the mobile terminal 104 is smaller than that of a block used by the ARQ, a plurality of data packets is stored in a block processed by one-time ARQ (310).

In 310 of FIG. 3, the acknowledgement (UL ARQ=2) transmitted by the mobile terminal 104 stores acknowledgements corresponding to sequence numbers 2920 and 4380.

In the TCP as a transport protocol, a sequence number for providing a high reliability communication is stored in the TCP header transmitted from the server 101. The sequence number of a data packet received by the mobile terminal 104 is stored in the TOP header of the acknowledgement transmitted from the mobile terminal 104. For this reason, the reception side detects whether a number is missing in a sequence number or a confirmation number of the received data packet to allow detecting that the data packet is lost and the data packet is discarded in communication. If the reception side detects that a number is missing in a sequence number or a confirmation number of the received data packet, the reception side requests the transmission side to retransmit the data packet in which a number is missing.

In the TOP as a transport protocol, the server 101 transmits only a sliding window size (or the data capacity of a sliding window) transmittable without waiting an acknowledgement and transmits the next data packet when the server 101 receives one acknowledgement. This enables communication in conformity with the bandwidth of the mobile terminal 104. The transmission of a data packet by the sliding window of the TOP is described in detail in FIG. 4.

Figure 4:
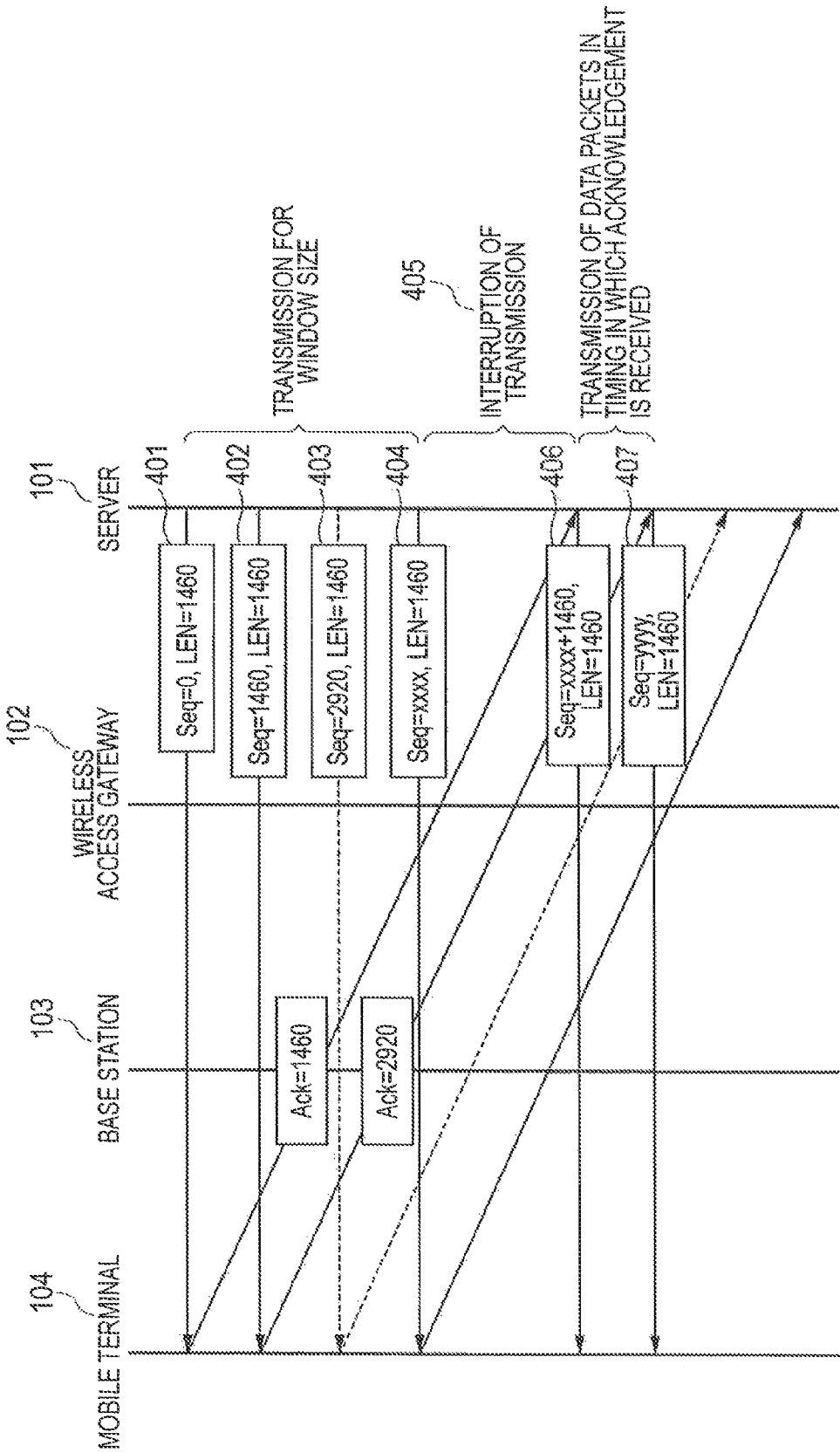
FIG. 4 is a diagram showing the transmission of a data packet by a sliding window of the TOP according to the first embodiment of the present invention.

FIG. 4 is a diagram showing the transmission of a data packet by the sliding window of the TOP according to the first embodiment of the present invention.

The server 101 transmits data packet for the sliding window size transmittable without waiting an acknowledgement (401 to 404).

In step 401, the server 101 transmits the data packet with a packet length of 1460 bytes and control numbers of 0 to 1459. In step 402, the server 101 transmits the data packet with a packet length of 1460 bytes and control numbers of 1460 to 2919. In step 403, the server 101 transmits the data packet with a packet length of 1460 bytes and control numbers of 2920 to 4379.

A step 404 shows that the server 101 transmits the data packet up to the sliding window size transmittable without waiting an acknowledgement. The data packet transmitted in step 404 has a packet length of 1460 bytes and a control number of xxxx to xxxx+1459.

When the server 101 completes the transmission in which the capacity of the data packet whose acknowledgement is not received reaches the sliding window size, the server 101 interrupts the transmission of the data packet (405).

When the server 101 receives the acknowledgement corresponding to the data packet transmitted in step 401, the server 101 transmits the net data packet (406). In step 406 and the subsequent steps, the server 101 transmits data packets in timing in which the server 101 receives an acknowledgement (407). More specifically, the server 101 can transmit data packets in conformity with the bandwidth of a network on the side of the mobile terminal 104 and cause through-put to conform to the bandwidth of a network on the side of the mobile terminal 104.

Figure 5:
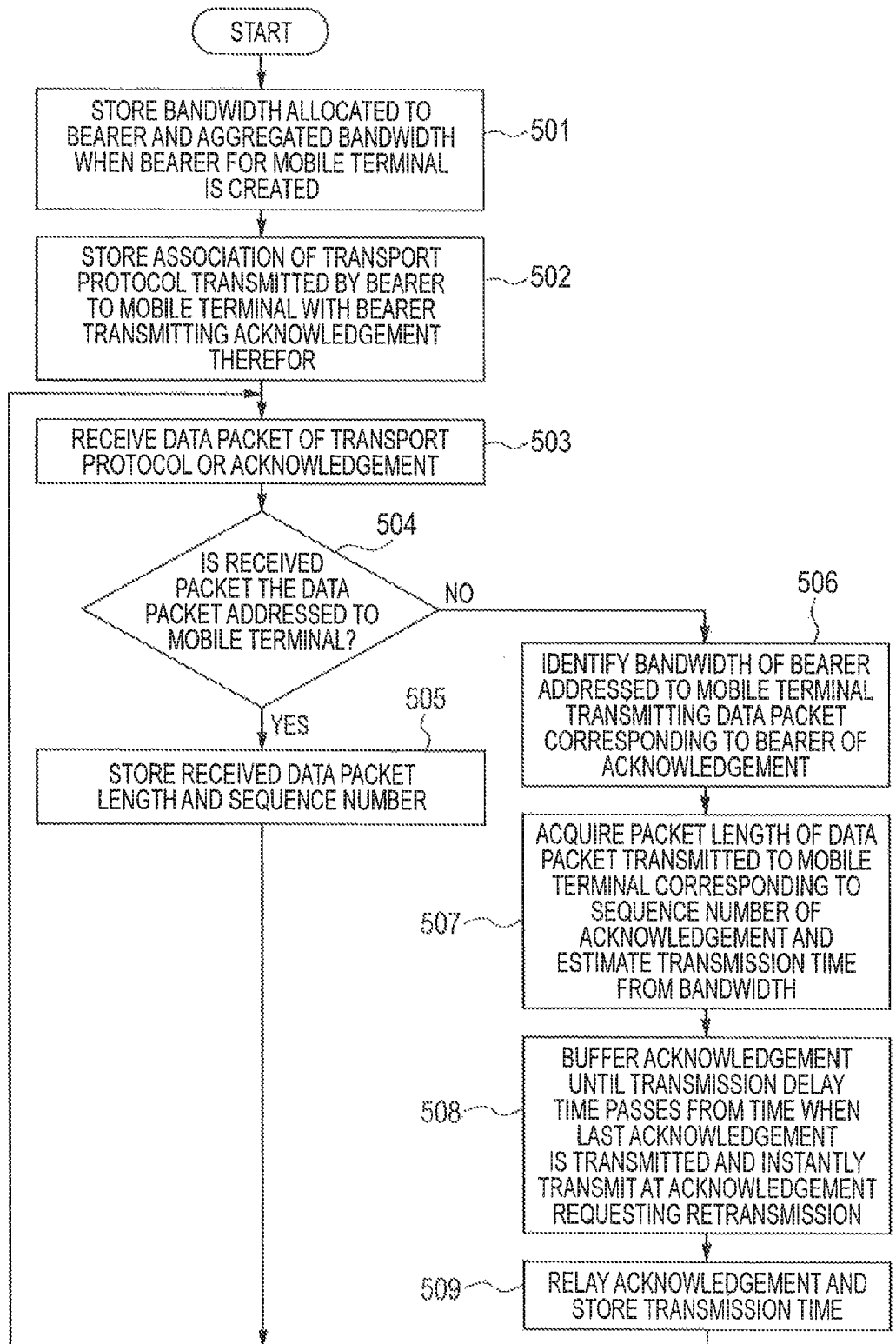
FIG. 5 is a flow chart for data packet relay processing executed by the wireless access gateway according to the first embodiment of the present invention.

FIG. 5 is a flow chart for data packet relay processing executed by the wireless access gateway 102 according to the first embodiment of the present invention.

When the wireless access gateway 102 creates a bearer used by the mobile terminal 104 between the mobile terminal 104 and the wireless access gateway 102, the wireless access gateway 102 stores the transmission rate of the radio access network 106 between the mobile terminal 104 and the wireless access gateway 102 in the scheduler table 209 (501).

The transmission rate stored in the scheduler table 209 may be a guaranteed bit rate for each bearer used by the mobile terminal 104 or a maximum bit rate of an individual or a collective bearer, for example.

The wireless access gateway 102 stores the association of the transport protocol of a bearer transmitting a data packet to the mobile terminal 104 with a bearer transmitting the acknowledgement for the data packet from the mobile terminal 104 in the scheduler table 209 (502).

In step 502, the wireless access gateway 102 may also store the association of the transport protocol of a bearer transmitting an acknowledgement to the server 101 with the transport protocol of a bearer transmitting a data packet from the server 101.

When the wireless access gateway 102 receives a packet related to the transport protocol (the data packet transmitted from the server 101 or the acknowledgement transmitted from the mobile terminal 104) (503), the wireless access gateway 102 determines whether the received packet is the data packet transmitted from the server 101 to the mobile terminal 104 (504).

In step 504, if it is determined that the received packet is the data packet transmitted from the server 101 to the mobile terminal 104, the wireless access gateway 102 stores the packet length and the sequence number of the received data packet in the scheduler table 209 (505) and the processing returns to step 503.

On the other hand, if it is determined that the received packet is not the data packet transmitted from the server 101 to the mobile terminal 104, in other words, if it is determined that the received packet is the acknowledgement transmitted from the mobile terminal 104 to the server 101, the wireless access gateway 102 identifies the transmission, rate at which the data packet transmitted from the server 101 corresponding to the received acknowledgement is transmitted to the mobile terminal 104 (506).

A method of identifying a transmission rate is specifically described below.

The wireless access gateway 102 identifies a bearer transmitting the data packet transmitted from the server 101 corresponding to the received acknowledgement with reference to the association, stored in the scheduler table 209 in step 502, of the transport protocol of the bearer transmitting a data packet to the mobile terminal 104 and the bearer in which an acknowledgement for the data packet is transmitted from the mobile terminal 104. The wireless access gateway 102 identifies the transmission rate of the identified bearer used by the mobile terminal 104 with reference to the transmission rate between the wireless access gateway 102 and the mobile terminal 104 stored in the scheduler table 209 in step 501.

The wireless access gateway 102 acquires the packet length of the data packet with the control number corresponding to the confirmation number of the received acknowledgement with reference to the packet length and the control number of the data packet transmitted to the mobile terminal 104, stored in the scheduler table 209 in step 505. The wireless access gateway 102 estimates the time spent until the data packet corresponding to the received acknowledgement reaches the mobile terminal 104 (transmission delay time) based on the packet length of the acquired data packet and the transmission rate used by the mobile terminal 104 identified in step 506 (507).

The wireless access gateway 102 buffers the acknowledgement received this time until the transmission delay time estimated in step 507 passes from the time when the last acknowledgement is transmitted among the time when the acknowledgement of the transport protocol of the bearer similar to the received acknowledgement is transmitted to the server 101 (508). The wireless access gateway 102 transmits the acknowledgement received this time to the server 101 when the transmission delay time estimated in step 507 passes from the time when the last acknowledgement is transmitted and stores the time when the acknowledgement received this time is transmitted to the server 101 (509) and the processing returns to step 503.

As described above, the wireless access gateway 102 relays the previous acknowledgement to the server 101, then delays the acknowledgement transmitted from the mobile terminal 104 by the time spent until the data packet transmitted from the server 101 corresponding to the acknowledgement is transferred to the mobile terminal 104 and relays the delayed acknowledgement to the server 101. For this reason, even if the acknowledgement is transmitted at a burst, the wireless access gateway 102 delays the acknowledgement by the transmission delay time from the time when the previous acknowledgement is transmitted and transmits the delayed acknowledgement to the server 101, allowing preventing the server 101 from receiving the acknowledgement at a burst.

Since the period during which the wireless access gateway 102 transmits an acknowledgement takes the delay time of acknowledgement as the time spent until the data packet transmitted from the server 101 is transferred to the mobile terminal 104, when the mobile terminal 104 receives the data packet next to the data packet corresponding to the acknowledgement received this time by the wireless access gateway 102, the server 101 receives the acknowledgement received this time by the wireless access gateway 102 and transmits the next data packet to the mobile terminal 104. Therefore, the packet for a window size is communicated via the network between the server 101 and the mobile terminal 104 to allow the packet to be effectively communicated between the server 101 and the mobile terminal 104.

In the present embodiment, the wireless access gateway 102 stores the confirmation number of the acknowledgement received from the mobile terminal 104 instead of storing the packet length of the data packet transmitted to the mobile terminal 104 in step 505. In step 507, the wireless access gateway 102 estimates the packet length of the data packet transmitted from the server 101 corresponding to the acknowledgement received this time based on the difference value between the confirmation number of the acknowledgement received this time and the confirmation number of the acknowledgement received last time.

In the present embodiment, although the transmission delay time is estimated in steps 506 and 507 when the acknowledgement transmitted from the mobile terminal 104 is transmitted to the server 101, the transmission delay time is previously estimated when the data packet transmitted from the server 101 is transmitted to the mobile terminal 104 and the estimated transmission delay time may be stored.

The wireless access gateway 102 further stores the time at which the data packet transmitted form the server 101 is transmitted to the mobile terminal 104, the sequence number of the data packet, and the packet length of the data packet. The wireless access gateway 102 identifies the data packet with the sequence number corresponding to the confirmation number of the received acknowledgement. The wireless access gateway 102 cumulatively calculates the difference between the time at which the identified data packet is transmitted and the time at which the acknowledgement is received as a round-trip time. The wireless access gateway 102 divides the calculated cumulative round-trip time by the sum of the packet length of the data packet and the packet length of the acknowledgement and multiplies the divided value by the packet length of the data packet to estimate the transmission delay time.

If the confirmation request received from the mobile terminal 104 is a retransmission request acknowledgement indicating a retransmission request for a data packet in step 508, the wireless access gateway 102 instantly transmits the retransmission request acknowledgement for only the transmission delay time to the server 101 without waiting.

If the confirmation number of the received acknowledgement precedes that of the acknowledgement received in advance of the received acknowledgement, the wireless access gateway 102 determines that the received acknowledgement is the retransmission request acknowledgement in other words, if the control number of the data packet corresponding to the received acknowledgement precedes that of the data packet corresponding to the acknowledgement received in advance of the received acknowledgement, the wireless access gateway 102 determines that the received acknowledgement is the retransmission request acknowledgement.

Figure 6:
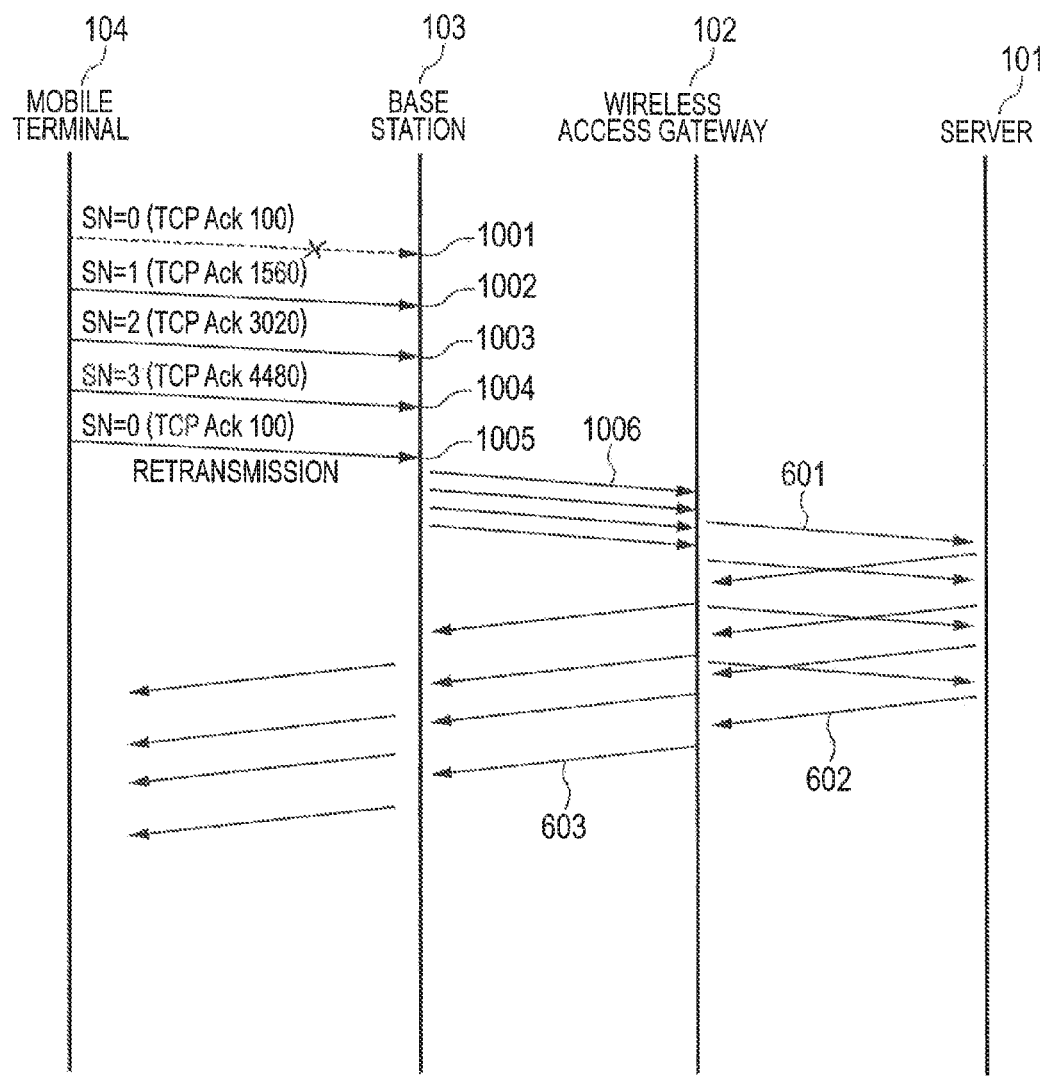
FIG. 6 is a diagram showing communication in the mobile communication system of the first embodiment of the present invention.
Figure 10:
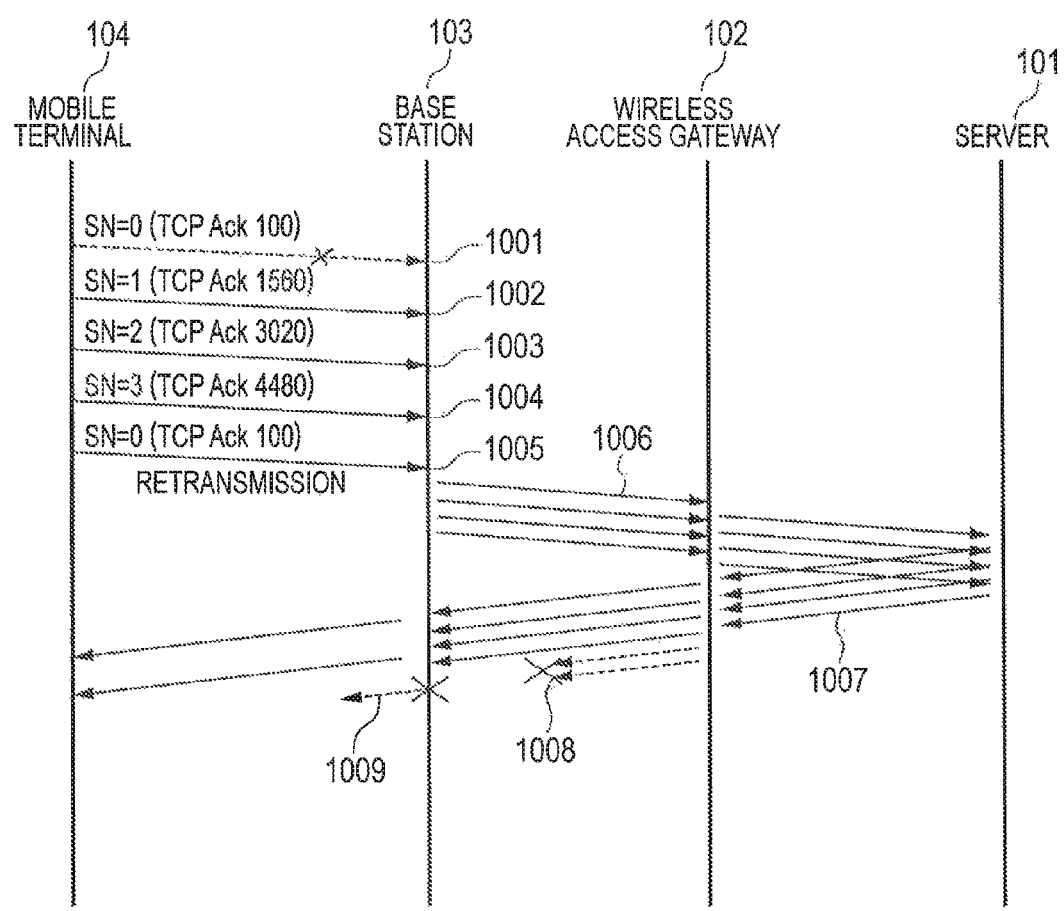
FIG. 10 is a conventional diagram of the present invention.

FIG. 6 is a diagram showing communication in the mobile communication system of the first embodiment of the present invention. The processes similar to those in FIG. 10 are denoted by the same reference numerals and the description thereof is omitted.

In step 1006, if the base station 103 transmits four acknowledgements at a burst, the wireless access gateway 102 receives the four acknowledgements and takes the interval of transmission of the received acknowledgement to the server 101 as a transmission delay time interval described in FIG. 5.

The server 101, therefore, receives the acknowledgement in the transmission delay time interval (601). For this reason, the server 101 newly transmits data packets in the transmission delay time interval (602).

The wireless access gateway 102 and the base station 103 transmit each packet and then receive the next packet, allowing preventing the discard of the packet due to queue overflow (603).

As described above, in the present embodiment, the wireless access gateway 102 delays the acknowledgement transmitted from the mobile terminal 104 by the time spent until the data packet transmitted from the server 101 (transmission delay time) corresponding to the acknowledgement is transferred to the mobile terminal 104 and relays the delayed acknowledgement to the server 101 after the wireless access gateway 102 relays an acknowledgement previous to the acknowledgement to the server 101. For this reason, even if the acknowledgement is transmitted at a burst, the wireless access gateway 102 delays the acknowledgement by the transmission delay time from the time when the previous acknowledgement is transmitted and transmits the delayed acknowledgement to the server 101, allowing preventing the server 101 from receiving the acknowledgement at a burst and from transmitting data packets at a burst. Accordingly, in the wireless access gateway 102 and the base station 103, the discard of the packet due to queue overflow can be prevented.

Second Embodiment

In the second embodiment, the base station 103 has a function, which the wireless access gateway 102 has in the first embodiment, to relay an acknowledgement with the acknowledgement delayed.

Figure 7:
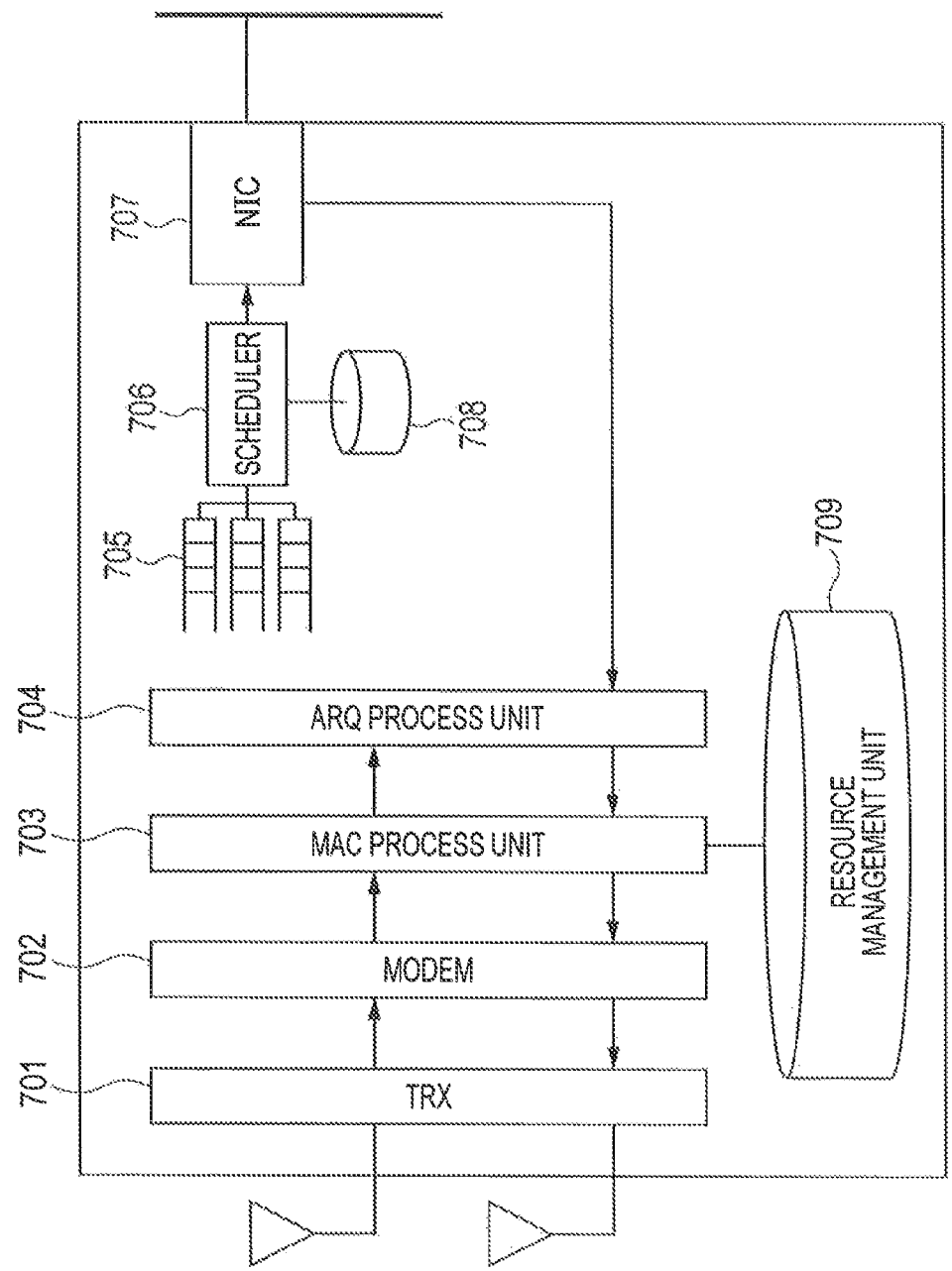
FIG. 7 is a diagram showing a configuration of the base station in a second embodiment of the present invention.

FIG. 7 is a diagram showing a configuration of the base station 103 in the second embodiment of the present invention.

The base station 103 includes a TRX 701, a MODEM 702, a MAC process unit 703, an ARQ process unit 704, a queue 705, a scheduler 706, a network interface card NIC 707, a scheduler table 708, and a resource management unit 709.

The TRX 701 digital-to-analog converts a packet to be transmitted and analog-to-digital converts the received packet. The MODEM 702 subjects a signal to be transmitted to and received from an antenna to a modulation-demodulation process. The MAC process unit 703 allocates resources such as a band, frequency, and time frame used for transmission to and reception from the mobile terminal 104 to the mobile terminal 104. The ARC) process unit 704 executes the ARQ process of a radio link layer between the mobile terminal 104 and the base station 103. The ARQ process is sometimes executed by a radio base station control device (RNC and BSC) for controlling the base station 103.

The queue 705 is the one in which a packet addressed to the mobile terminal 104 or the server 101 is received and buffered. The scheduler 706 extracts a packet from the queue 705 and transmits the packet to a network via the NIC 707. The scheduler table 708 is the one to which the scheduler 706 refers when extracting a packet from the queue 705.

The NIC 707 is an interface for connecting the base station 103 with the wireless access gateway 102.

The resource management unit 709 is the one to which the MAC process unit 703 refers when allocating a resource to the mobile terminal 104.

Figure 8:
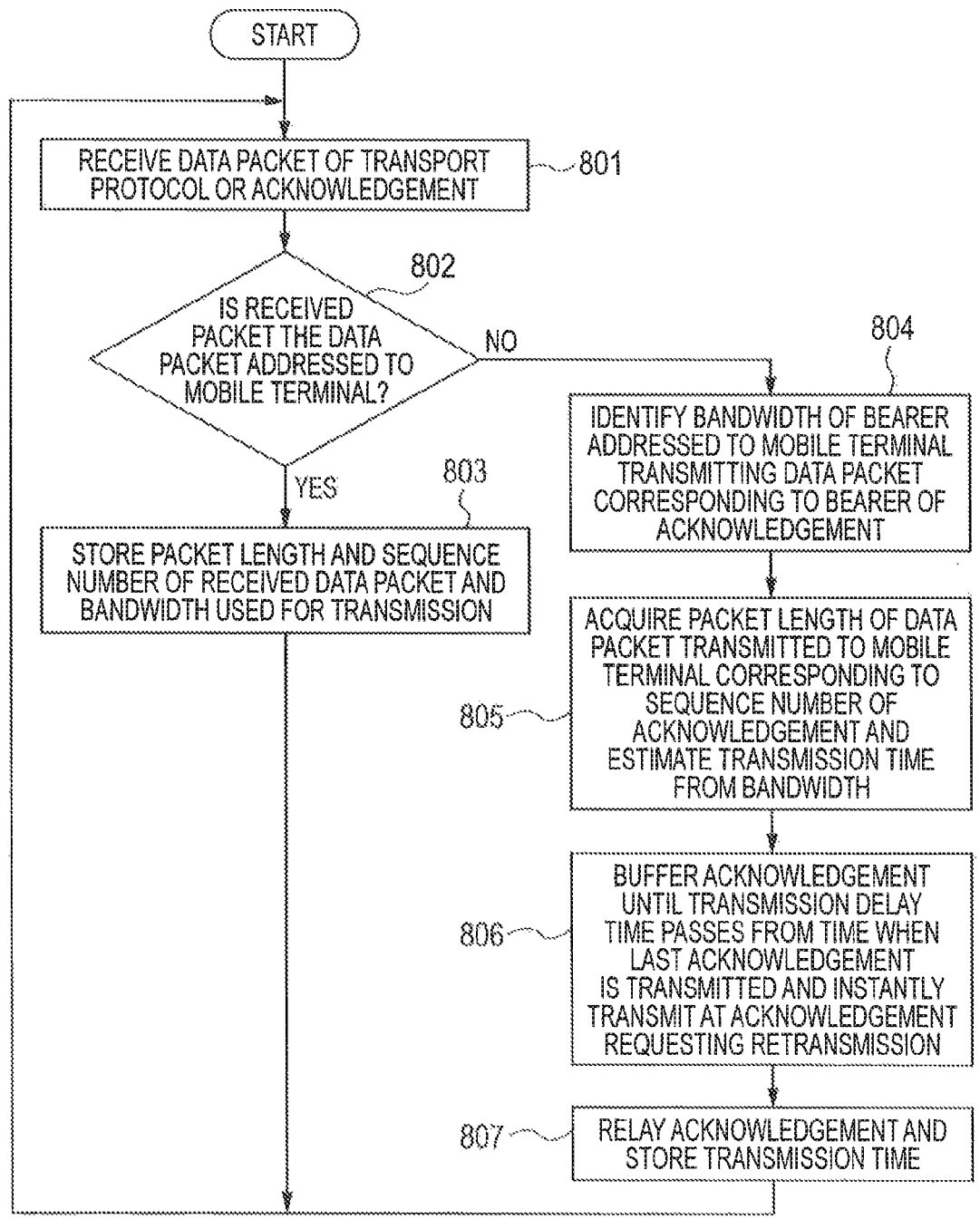
FIG. 8 is a flow chart for a data packet relay process executed by the base station according to the second embodiment of the present invention.

FIG. 8 is a flow chart for a data packet relay process executed by the base station 103 according to the second embodiment of the present invention.

When the base station 103 receives a packet to data packet transmitted from the server 101 or an acknowledgement transmitted from the mobile terminal 104) related to a transport protocol (801), the base station 103 determines whether the received packet is the data packet transmitted from the server 101 to the mobile terminal 104 (802).

In step S802, if the base station 103 determines that the received packet is the data packet transmitted from the server 101 to the mobile terminal 104, the base station 103 estimates the bandwidth of a bearer used for communication with the mobile terminal 104 with reference to the resource management unit 709. The base station 103 stores the packet length of the received data packet, the sequence number of the received data packet, and the bandwidth of the estimated bearer (803). The processing returns to step 801.

In step 803, the base station 103 stores association of the transport protocol of the bearer transmitting a data packet to the mobile terminal 104 and the bearer transmitting the acknowledgement for the data packet from the mobile terminal 104 in the scheduler table 708.

In step 803, the base station 103 may store also association of the transport protocol of the bearer transmitting an acknowledgement to the server 101 and the transport protocol of the bearer transmitting a data packet from the server 101.

On the other hand, in step 802, if the base station 103 determines that the received packet is not the data packet transmitted from the server 101 to the mobile terminal 104, in other words, if the base station 103 determines that the received packet is the acknowledgement transmitted from the mobile terminal 104 to the server 101, the base station 103 identifies a transmission rate at which the data packet transmitted from the server 101 corresponding to the received acknowledgement is transmitted to the mobile terminal 104 (804).

A method of identifying a transmission rate is described in detail below.

The base station 103 identifies the bearer transmitting the data packet transmitted from the server 101 corresponding to the received acknowledgement with reference to the association of the transport protocol of the bearer transmitting a data packet to the mobile terminal 104 and the bearer transmitting the acknowledgement for the data packet from the mobile terminal 104 stored in the scheduler table 708 in step 803. The base station 103 identifies the bandwidth of the identified bearer (transmission rate) used by the mobile terminal 104 with reference to the bandwidth of the bearer stored in the scheduler table 708 in step 803 (804).

The base station 103 acquires the packet length of the data packet with the control number corresponding to the confirmation number of the received acknowledgement with reference to the packet length and the control number of the data packet transmitted to the mobile terminal 104 stored in the scheduler table 708 in step 803. The base station 103 estimates the time spent until the data packet corresponding to the received acknowledgement is transferred to the mobile terminal 104 (transmission delay time based on the acquired packet length of the data packet and the transmission rate of the bearer used by the mobile terminal 104 identified in step 804 (805).

The base station 103 buffers the acknowledgement received this time until the transmission delay time estimated in step 805 passes from the time at which the last acknowledgement is transmitted among the time during which the acknowledgement of the transport protocol belonging the seine bearer as the acknowledgement received this time is transmitted to the server 101 (806). When the transmission delay time estimated in step 805 passes from the time at which the last acknowledgement is transmitted the base station 103 transmits the acknowledgement received this time to the server 101 and stores the time at which the acknowledgement received this time is transmitted to the server 101 (807). The processing returns to step 801.

In step 807, if the confirmation request received from the mobile terminal 104 is a retransmission request acknowledgement indicating a retransmission request for a data packet, the base station 103 instantly transmits the retransmission request acknowledgement for only the transmission delay time to the server 101 without waiting.

If the confirmation number of the received acknowledgement precedes that of the acknowledgement received in advance of the received acknowledgement, the base station 103 determines that the received acknowledgement is the retransmission request acknowledgement. In other words, if the control number of the data packet corresponding to the received acknowledgement precedes that of the data packet corresponding to the acknowledgement received in advance of the received acknowledgement, the base station 103 determines that the received acknowledgement is the retransmission request acknowledgement.

The transmission delay time may be estimated using a plurality of methods described in the first embodiment.

As described above, the base station 103 delays the acknowledgement transmitted from the mobile terminal 104 by the time spent until the data packet transmitted from the server 101 (transmission delay time) corresponding to the acknowledgement is transferred to the mobile terminal 104 and relays the delayed acknowledgement to the server 101 after the base station 103 relays an acknowledgement previous to the acknowledgement to the server 101. For this reason, even if the acknowledgement is transmitted at a burst, the base station 103 delays the acknowledgement by the transmission delay time from the time when the previous acknowledgement is transmitted and transmits the delayed acknowledgement to the server 101, allowing preventing the server 101 from receiving the acknowledgement at a burst.

Since the delay time of the acknowledgement is taken as the time spent until the data packet transmitted from the server 101 is transferred to the mobile terminal 104, when the mobile terminal 104 receives the data packet next to the data packet corresponding to the acknowledgement received this time by the base station 103, the server 101 receives the acknowledgement received this time by the base station 103 and transmits the next data packet to the mobile terminal 104. Therefore, the packet for a window size is communicated via the network between the server 101 and the mobile terminal 104 to allow the packet to be effectively communicated between the server 101 and the mobile terminal 104.

Third Embodiment

In the first and second embodiments, the base station 103 divides a first data packet transmitted from the server 101 into a plurality of data blocks, provides the data blocks with control numbers, and transmits the data blocks to the mobile terminal 104. When the base station 103 receives the acknowledgements of all the data blocks into which the first data packet is divided, the base station 103 transmits the acknowledgement corresponding to the first data packet to the server 101 in other words, the base station 103 does not transmit the acknowledgement corresponding to the first data packet until the acknowledgements of all the data blocks into which the first data packet is divided are completed.

In the third embodiment, when the base station 103 receives the acknowledgement data block of a first data block to which a first data packet is divided, the base station 103 transmits the acknowledgement data block to the server 101 without waiting the acknowledgements of all of the data blocks to which a first data packet is divided.

When the base station 103 receives the acknowledgement transmitted corresponding to the mobile terminal 104 receiving the data block, the base station 103 stores the confirmation number of the received acknowledgement.

The base station 103 detects whether a number is missing in the confirmation number of the received acknowledgement is missing.

More specifically, the base station 103 calculates a difference between the sequence numbers till the confirmation number stored last among the sequence numbers of the data blocks already transmitted and all the stored confirmation numbers to detect that a number is missing in the confirmation number of the received acknowledgement if there is a difference if the base station 103 detects that a number is missing in the confirmation number of the received acknowledgement, the base station 103 transmits the acknowledgement, to the server 101, indicating that the acknowledgement of the confirmation number of the difference between the sequence numbers till the confirmation number stored last among the sequence numbers of the data blocks already transmitted and all the stored confirmation numbers is not received.

If the base station 103 receives all the acknowledgements of the confirmation number in which a number is missing, the base station 103 transmits the acknowledgement indicating that all the acknowledgements of all the data blocks to which the first data block is divided are received to the server 101.

The third embodiment is described in detail with reference to FIG. 9.

Figure 9:
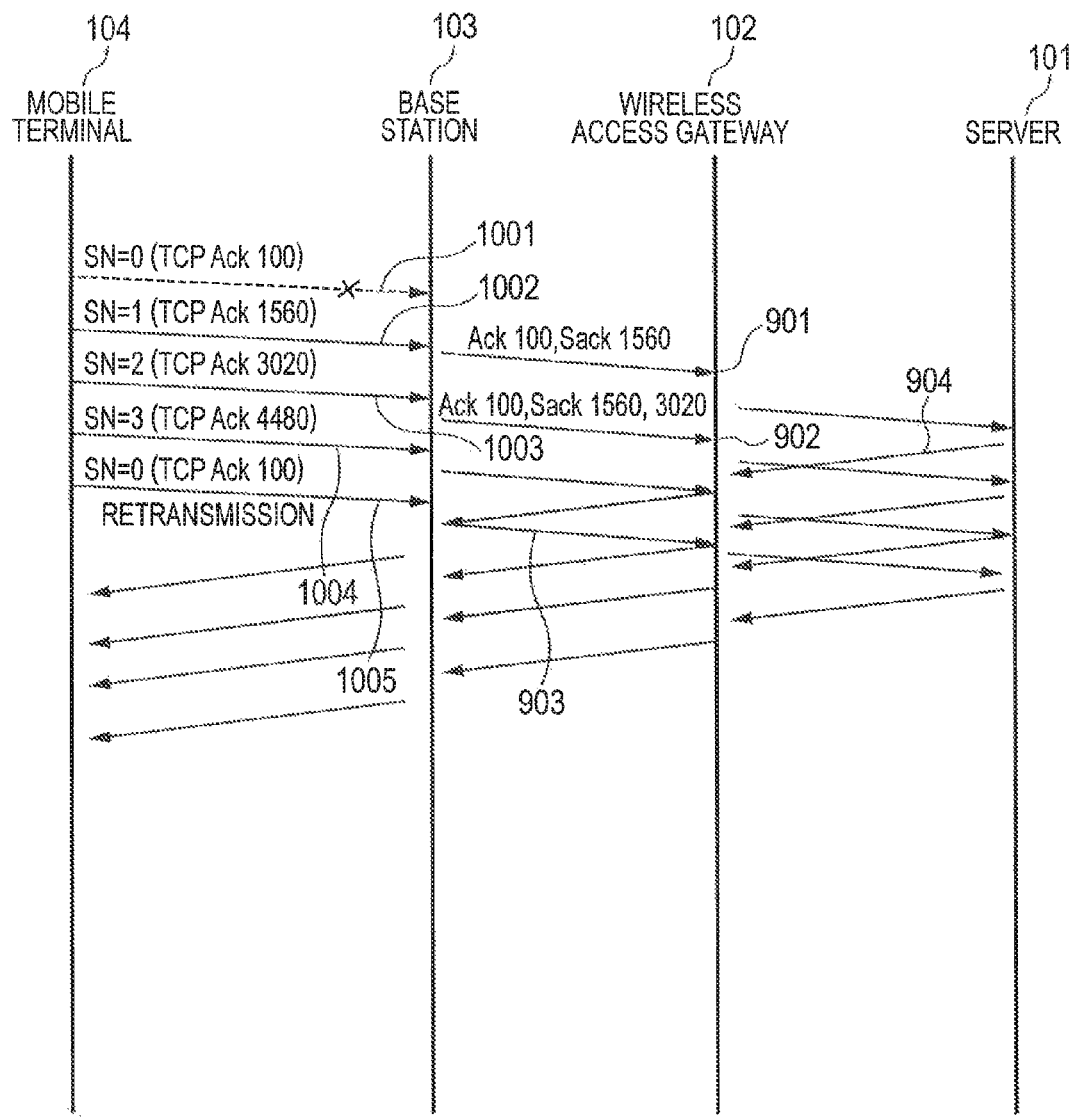
FIG. 9 is a diagram showing communication in the mobile communication system of a third embodiment of the present invention.

FIG. 9 is a diagram showing communication in the mobile communication system of the third embodiment of the present invention. The processes similar to those in FIG. 10 are denoted by the same reference numerals and the description thereof is omitted.

In step 1001, the base station 103 fails to receive the acknowledgement of a confirmation number 100. In step 1002, when the base station 103 normally receives the acknowledgement of a confirmation number 1560, the base station 103 detects whether a number is missing in the confirmation number.

More specifically, since there is a difference (100) between the sequence numbers (100 and 1560) till the confirmation number (1560) stored last among the sequence numbers of the data blocks already transmitted and all the stored confirmation numbers (1560), the base station 103 detects that a number is missing in the acknowledgement of the confirmation number (1560).

The base station 103 transmits a selection acknowledgement including the confirmation number of the received acknowledgement and the confirmation number in which a number is missing to the server 101 (901). The confirmation number (1560) of the received acknowledgement is stored in the SACK block of the selection acknowledgement and the confirmation number (100) in which a number is missing is stored in the ACK block of the selection acknowledgement.

In step 1003, when the base station 103 normally receives the acknowledgement of a confirmation number 3120, the base station 103 detects whether a number is missing in a confirmation number. The base station 103 detects that the confirmation number 100 is missing herein, so that the base station 103 transmits the selection acknowledgement to the server 101 (902). The SACK block of the selection acknowledgement stores the confirmation numbers 1560 and 3120. The ACK block of the selection acknowledgement stores the confirmation number 100.

In step 1005, when the base station 103 receives the acknowledgement of the confirmation number 100 in which a number is missing, the base station 103 receives all the acknowledgements corresponding to all the data blocks to which the first data packet is divided, so that the base station 103 transmits the acknowledgement indicating that all the acknowledgements are wholly received to the server 101 (903).

On the other hand, in step 901, when the server 101 receives the transmitted selection acknowledgement, the server 101 transmits the next data packet (904).

As described above, even though the base station 103 detects that a number is missing, the base station 103 transmits a selection acknowledgement to the server 101, so that the server 101 can transmit a data packet in conformity with the transmission rate between the base station 103 and the mobile terminal 104.

This prevents the server 101 from receiving acknowledgements at a burst and transmitting data packets at a burst and packets from being discarded due to queue overflow at the router and the switch in the radio access network 106 and at the base station 103.

The mobile terminal and the gateway equipment the base station or the wireless access gateway) can be applied to a mobile communication system.

What is claimed is:

1. A mobile communication system comprising a mobile terminal and gateway equipment for relaying a packet between a communication partner and the mobile terminal,
   wherein the gateway equipment
   stores information about a transmission rate between the mobile terminal and the gateway equipment;
   stores a packet length of a packet relayed from the communication partner to the mobile terminal and the time at which an acknowledgement corresponding to the packet transmitted from the mobile terminal to the communication partner is received in a process related to a transport protocol used between the mobile terminal and the communication partner;
   estimates a transmission time required for transmitting the packet from the gateway equipment to the mobile terminal based on the length of a packet and the transmission rate to the mobile terminal; and
   relays a previous acknowledgement from the mobile terminal to the communication partner, delays the received acknowledgement from the mobile terminal by the estimated transmission time, and relays the delayed received acknowledgement to the communication partner.

2. The mobile communication system according to claim 1,
   wherein the acknowledgement transmitted from the mobile terminal to the communication partner is provided with a sequence number increasing according to the packet length of a packet corresponding to the acknowledgement, and
   wherein the gateway equipment stores the control number of the acknowledgement instead of the packet length of a packet relayed from the communication partner to the mobile terminal in the process related to the transport protocol used between the mobile terminal and the communication partner;

identifies the packet length of the packet corresponding to the acknowledgement received this time from a difference between the control number of the acknowledgement received last time and the control number of the acknowledgement received this time; and estimates a transmission time required for transmitting the packet from the base station to the mobile terminal based on the identified packet length and the transmission rate.

3. The mobile communication system according to claim 1, wherein the gateway equipment estimates the transmission time when relaying the packet from the communication partner to the mobile terminal based on the packet length of the relayed packet and the transmission rate.

4. The mobile communication system according to claim 1, wherein the gateway equipment stores the time at which the packet is transmitted to the mobile terminal in addition to the time at which the acknowledgement is received in the process related to the transport protocol used between the mobile terminal and the communication partner;

calculates the transmission rate based on the packet length of the packet, the time at which the packet is transmitted, and the time at which the acknowledgement corresponding to the packet is received; and stores the calculated transmission rate as the transmission rate between the mobile terminal and the gateway equipment.

5. The mobile communication system according to claim 1, wherein the gateway equipment, if the received acknowledgement is a retransmission request acknowledgement indicating a request for retransmitting the packet to the communication partner, transmits the retransmission request acknowledgement without waiting the transmission of the retransmission request acknowledgement.

6. The mobile communication system according to claim 5, wherein when the gateway equipment receives the acknowledgement, the gateway equipment takes the received acknowledgement as the retransmission request acknowledgement if the packet corresponding to the received acknowledgement is transmitted from the gateway equipment to the mobile terminal earlier than a packet corresponding to an acknowledgement received earlier than the received acknowledgement.

7. The mobile communication system according to claim 1, wherein the communication partner is a computer transmitting, on receipt of receiving the acknowledgement, a packet next to the packet corresponding to the received acknowledgement.

8. The mobile communication system according to claim 1, wherein the transmission rate between the mobile terminal and the gateway equipment is lower than that between the gateway equipment and the communication partner.

9. A packet communication method in a mobile communication system that includes a mobile terminal and gateway equipment for relaying a packet between a communication partner and the mobile terminal, the gateway equipment storing information about a transmission rate between the mobile terminal and the gateway equipment, the packet communication method comprising:

a first step of storing a packet length of a packet relayed from the communication partner to the mobile terminal and the time at which an acknowledgement corresponding to the packet transmitted from the mobile terminal to the communication partner is received in a process related to a transport protocol used between the mobile terminal and the communication partner;

a second step of estimating a transmission time required for transmitting the packet from the gateway equipment to the mobile terminal based on the length of a packet and the transmission rate to the mobile terminal; and a third step of relaying a previous acknowledgement from the mobile terminal to the communication partner, delaying the received acknowledgement from the mobile terminal by the estimated transmission time, and relaying the delayed received acknowledgement to the communication partner.

10. The packet communication method according to claim 9, wherein the acknowledgement transmitted from the mobile terminal to the communication partner is provided with a sequence number increasing according to the packet length of a packet corresponding to the acknowledgement, and wherein in the first step, the control number of the acknowledgement is stored instead of the packet length of a packet relayed from the communication partner to the mobile terminal, wherein the packet communication method further comprising a fourth step of identifying the packet length of the packet corresponding to the acknowledgement received this time from a difference between the control number of the acknowledgement received last time and the control number of the acknowledgement received this time, and wherein in the second step, a transmission time required for transmitting the packet from the base station to the mobile terminal is estimated based on the packet length identified in the fourth step and the transmission rate.

11. The packet communication method according to claim 9, wherein in the first step, the transmission time is estimated when the gateway equipment relays the packet from the communication partner to the mobile terminal based on the packet length of the relayed packet and the transmission rate and the estimated transmission time is stored.

12. The packet communication method according to claim 9, wherein in the first step, the time at which the packet is transmitted to the mobile terminal is stored in addition to the time at which the acknowledgement is received in the process related to the transport protocol used between the mobile terminal and the communication partner, and wherein in the second step, the transmission rate is calculated based on the packet length of the packet, the time at which the packet is transmitted, and the time at which the acknowledgement corresponding to the packet is received and the calculated transmission rate is stored as the transmission rate between the mobile terminal and the gateway equipment.

13. The packet communication method according to claim 9, wherein in the third step, if the received acknowledgement is a retransmission request acknowledgement indicating a request for retransmitting the packet to the communication partner, the retransmission request acknowledgement is transmitted without waiting the transmission of the retransmission request acknowledgement.

14. The packet communication method according to claim 13, wherein in the third step, when the acknowledgement is received, the received acknowledgement is taken as the retransmission request acknowledgement if the packet corresponding to the received acknowledgement is transmitted from the gateway equipment to the mobile terminal earlier than a packet corresponding to an acknowledgement received earlier than the received acknowledgement.

15. The packet communication method according to claim 9, wherein the communication partner is a computer transmitting, on receipt of receiving the acknowledgement, a packet next to the packet corresponding to the received acknowledgement.

16. The packet communication method according to claim 9, wherein the transmission rate between the mobile terminal and the gateway equipment is lower than that between the gateway equipment and the communication partner.

* * * * *